United States Patent
Priest

[19]

[11] Patent Number: 6,038,436
[45] Date of Patent: Mar. 14, 2000

[54] METHOD AND APPARATUS FOR CONSERVING POWER IN PORTABLE, BATTERY-OPERATED RADIOS

[75] Inventor: Mark D. Priest, Rustburg, Va.

[73] Assignee: Ericsson Inc., Research Triangle Park, N.C.

[21] Appl. No.: 08/445,227

[22] Filed: May 18, 1995

[51] Int. Cl.⁷ .................................................. H04B 1/40
[52] U.S. Cl. .................... 455/343; 455/38.3; 455/515
[58] Field of Search ................... 455/38.2, 38.3, 455/343, 54.1, 54.2, 56.1, 127, 434, 515, 574, 337; 379/58, 59; 340/875.44; 370/313

[56] References Cited

U.S. PATENT DOCUMENTS

| | | |
|---|---|---|
| 4,239,678 | 12/1980 | Grube et al. . |
| 4,486,853 | 12/1984 | Parsons . |
| 4,964,121 | 10/1990 | Moore . |
| 5,101,510 | 3/1992 | Duckeck ................................ 455/343 |
| 5,175,874 | 12/1992 | Auchter .................................. 455/343 |
| 5,185,604 | 2/1993 | Nepple et al. ..................... 340/825.44 |
| 5,265,270 | 11/1993 | Stengel et al. . |
| 5,280,650 | 1/1994 | Sobti ...................................... 455/343 |
| 5,347,269 | 9/1994 | Van Den Heuvel ............... 340/825.44 |
| 5,396,660 | 3/1995 | Cannon ................................. 455/343 |
| 5,471,655 | 11/1995 | Kivari ................................... 455/343 |
| 5,542,116 | 7/1996 | Schellinger ........................... 455/343 |

FOREIGN PATENT DOCUMENTS

| | | |
|---|---|---|
| 0343528 | 11/1989 | European Pat. Off. . |
| 94 27377 | 11/1994 | WIPO . |

*Primary Examiner*—Thanh Cong Le
*Assistant Examiner*—Lester G. Kincaid
*Attorney, Agent, or Firm*—Nixon & Vanderhye P.C.

[57] ABSTRACT

A battery-powered portable radio conserves battery power while the radio monitors messages transmitted over a radio channel, e.g., a radio control channel, Message processing circuitry processes a detected message and stores that message in memory. Before processing a subsequently detected message, the subsequent message is compared with the stored message. It they do not match, the subsequently detected message is subjected to further processing including voting, matching, validity, checking, etc. However, if they match, the subsequent message is ignored as a redundant message and a power savings mode is entered to conserve battery power.

17 Claims, 3 Drawing Sheets

MESSAGE SEQUENCE ON CHANNEL
*Fig. 3(A)* (PRIOR ART)
EXAMPLE FORMAT OF A MESSAGE FRAME
*Fig. 3(B)*
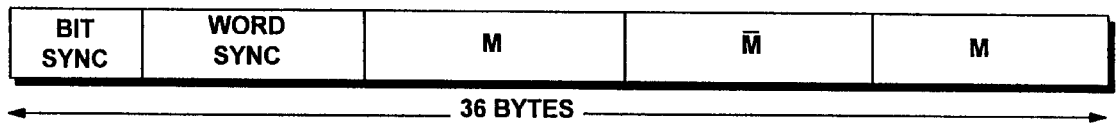
*Fig. 3(C)*
*Fig. 4*
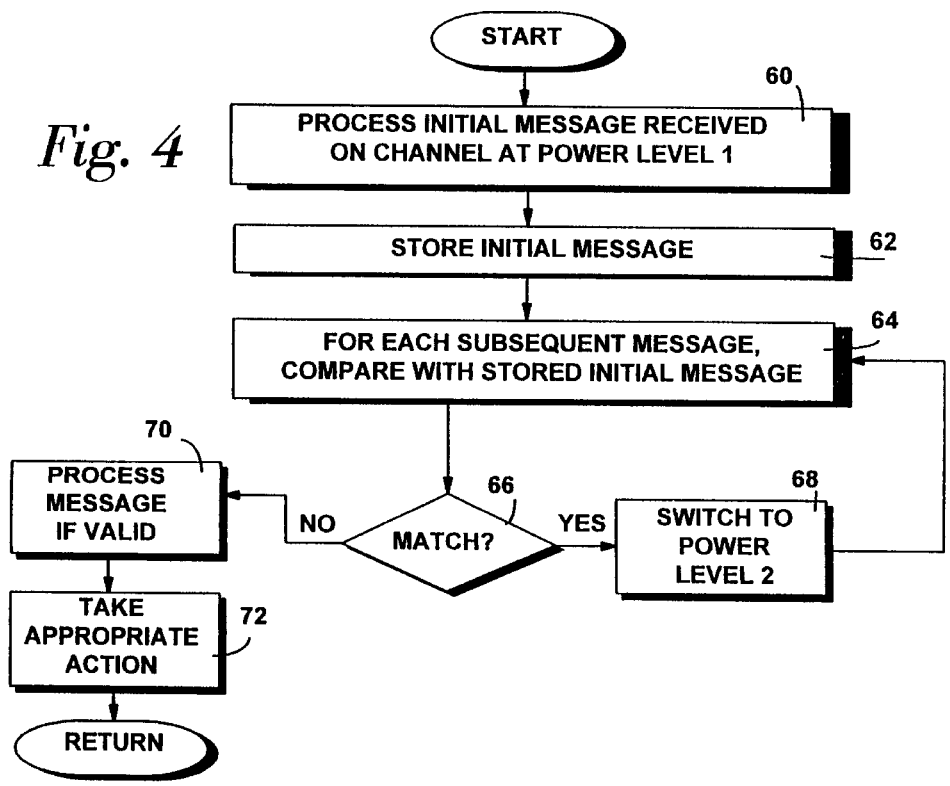

METHOD AND APPARATUS FOR CONSERVING POWER IN PORTABLE, BATTERY-OPERATED RADIOS

FIELD OF THE INVENTION

The present invention relates to radio communications, and in particular, to a method and apparatus for conserving power in a battery-operated portable radio.

BACKGROUND AND SUMMARY OF THE INVENTION

Portable radio communications require battery power. Because battery life is limited, efforts are on-going to provide longer lasting batteries and discover new techniques for minimizing battery drain. While one way of conserving power is to turn the radio off until the user wants to transmit a message, such a radio is of limited value because outside parties could not reach the user. As a result, portable radios typically monitor at least one communications channel in order to receive information/messages from outside sources that transmit on that channel. Unfortunately, if the receiver continuously monitors such a channel in order to detect and process those messages of interest to that radio user, current is continuously drawn, power is consumed and battery life is decreased. The useful life of the portable radio is therefore limited unless the user submits to the inconvenience of carrying additional batteries.

Radio systems that include digital communications capability, such as modern trunked radio and cellular systems, typically control and coordinate portable radio communications using a radio frequency channel designated (and often dedicated) as the control channel. Whenever radios are not actively engaged in a communication on a working channel via a working channel transceiver or repeater, they tune to a control channel frequency transmitted via a control channel transceiver/repeater under the control of a central controller or manager in charge of the geographical site or cell area in which the radio is located to detect and process digital control messages. Over this control channel, the radios transmit digital working channel request messages (e.g., when the user depresses a push-to-talk key) and status signalling, and the controller sends out working channel assignments including a transmit and receive frequency for the communication/call as well as other control signalling messages.

To ensure that radios always can confirm they are tuned to and monitoring the control channel, the central controller generates a continuous stream of digital control messages over the control channel. Consequently, radios within range of the control channel transceiver can always tune or retune to the control channel frequency, obtain the synchronization required for digital communications, and detect and process the received digital messages. Some of the control channel messages contain information the radio needs to process, and once processed, take perhaps some responsive action, e.g., a channel assignment. However, most of the traffic over the control channel are repeatedly transmitted messages, sometimes called "idle messages." One example of an idle message is the identification number or other code of the central controller which identifies the control channel, site or cell of the controller, etc.

For each received message irrespective of message type, the radio demodulates that message into binary ones and zeros and performs various data processing tasks on that demodulated message to determine the validity of the message, the type of the message, and its content. Each control channel message frame commonly includes plural copies of a message, each message copy having error correction bits included in an error correction field along with a substantive message field. Plural copies of the message in each message frame are used by the receiving radio to increase the probability of receiving a correct message. For example, one message processing operation to ensure the accuracy of the received data is to perform a voting operation of the copies of the received message in the message frame and to select as the substantive message bits and error correction bits for that message frame those bits found in the majority of the message copies, i.e., a majority vote. Subsequently, the error correction bits and the substantive message bits of the voted message are processed in accordance with some type of error detection and/or correction algorithm(s) such as conventional cyclic redundancy check algorithms (CRC). The radio microprocessor then typically decodes the message in some fashion to detect, for example, the type of message received, e.g., an idle message, a channel assignment message, etc.

Unfortunately, when the radio's microprocessor performs these majority vote and CRC type data processing operations for each message received on the control channel in accordance with program instructions stored in program memory, the microprocessor consumes considerable current. Each time the voting and CRC processes are performed on each received message, the microprocessor activates numerous registers, addresses and retrieves instructions from memory, and performs numerous arithmetic and manipulation operations. The power drain on the battery to support these operations is significant.

The inventor of the present invention recognized that radios can monitor and be in synchronization with the digital signalling over the control channel without having to continuously process and decode redundant, idle type messages to the degree described above. Portable radios in accordance with the present invention monitor various control messages and remain synchronized with a radio control channel. The radio fully processes and decodes one or more initially received messages to detect and maintain bit and word synchronization and to detect the message type. If the message is an idle message, the radio stores the idle message in memory. Rather than voting, CRC'ing, and decoding every received message, each subsequent message received on the control channel is compared with the stored message to determine if they match. If they do match, the radio enters a low power mode of operation where that message is ignored as a redundant idle message. By avoiding any further processing and decoding, the life of the radio battery is extended.

In other words, if the radio is receiving a series of redundant, idle messages identical to the idle message previously fully processed, decoded, and stored, the radio avoids further processing and decoding of these identical idle messages and conserves battery power until the next message is received. The simple matching operation consumes considerably less power than the full message processing typically carried out in conventional portable radios as described above.

If the compared messages do not match, the present invention further provides for voting plural copies of the subsequent message and then again comparing the voted message to the stored message to see if they match. Often, the failure to detect a match is simply the result of an erroneously received copy of the message. Many errors can be eliminated and a validly received message determined using a simple bit-by-bit voting algorithm of the plural copies of the received message. While the voting operation consumes some data processing overhead and therefore some added battery drain, it is significantly less than that required for CRC error detection/correction processing. Thus, if the voted message and the stored message match, the radio can avoid doing the CRC error detecting/checking data processing and thereby conserve power until the next message is received.

The present invention provides a battery-powered portable radio operable to monitor a particular radio channel for messages, e.g., a radio control channel, while still conserving power. In one embodiment, a programmable radio processor processes received messages by executing stored program instructions. At least one of the received messages is fully processed and stored in memory. A buffer is provided for storing received messages from the radio's transceiving circuitry. When the processor determines that a previously processed message stored by the processor is the same as a received message stored in the buffer, the processor discontinues further processing of that message to operate the radio in a battery conserving mode.

The buffer is part of a universal asynchronous receiver transmitter (UART) that buffers a predetermined number of digital words (bytes) corresponding to the length of an individual message frame. When that number of bytes is stored in the UART buffer, the UART sends an interrupt to the radio processor to wake the processor up out of its battery conserving mode. The processor then determines whether the buffered message matches the message previously stored by the processor. If there is a match, the radio is returned to the battery conserving mode of operation.

In another example embodiment of the present invention, application specific integrated logic circuity is specifically configured to perform (1) a voting operation for each received message copy in a message frame to generate a voted message and (2) a validity checking operation to check the validity of the voted message. Because the integrated logic is designed to specifically and efficiently perform these voting and validity checking operations using hardware circuitry, considerably less battery power is consumed relative to the power which would have been consumed if those same operations were performed using software programmed instructions executed by a programmable processor. In addition, the integrated logic circuity only sends to the programmable radio processor for further processing validly received messages which differ from a previously received message.

BRIEF DESCRIPTION OF THE DRAWINGS

These and other objects and advantages of the present invention will become more apparent by referring to the following detailed description and drawings, in which:

FIG. 3(a) is a representative message sequence transmitted on a radio channel;

FIG. 3(b) is an example format of a single message transmitted on the radio channel;

FIG. 3(c) is another example format of a message transmitted on the radio channel;

FIG. 4 is a flowchart diagram implemented by a portable radio to conserve battery power in accordance with the present invention;

DETAILED DESCRIPTION OF PREFERRED EMBODIMENTS

In the following description, for purposes of explanation and not limitation, specific details are set forth, such as particular circuits, interfaces, techniques, etc. in order to provide a thorough understanding of the present invention. However, it will be apparent to one skilled in the art that the present invention may be practiced in other embodiments that depart from these specific details. In other instances, detailed descriptions of well-known methods, devices, circuits, circuit components, etc. are omitted so as not to obscure the description of the present invention with unnecessary detail.

Figure 1:
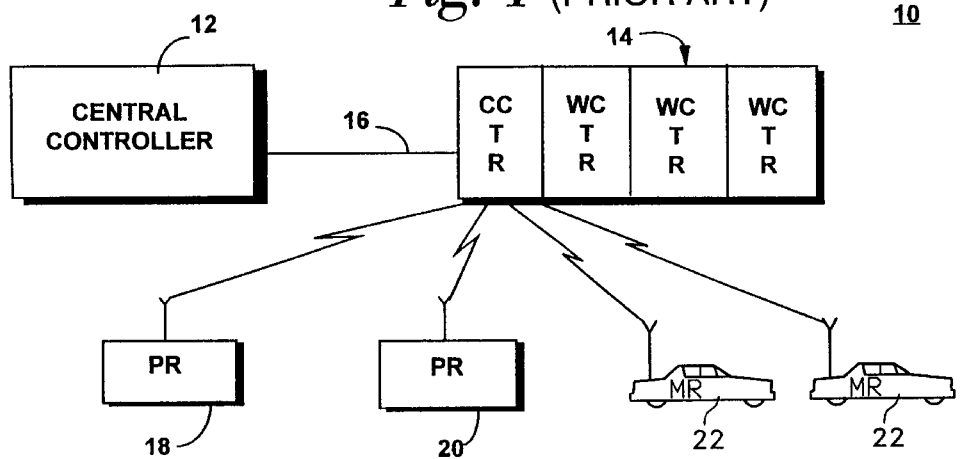
FIG. 1 is a function block diagram of an example radio communications system.

An example radio communication system in which the present invention may be used is generally depicted in prior art FIG. 1 as reference numeral 10. A central controller 12 is connected by communications link 16 to a base station 14 comprised of a plurality of transceivers, sometimes referred to as "repeaters." Each base station transceiver transmits on a particular radio frequency and receives on another radio frequency offset from its transmit frequency. One base station transceiver functions as a control channel (CC) for transmitting various digital control messages on the control channel transmit frequency and for receiving digital control messages from radios in the site/cell/area serviced by the radio communication system. FIG. 1 illustrates examples of both portable radios (PR) 18 and 20 as well as mobile radios (MR) 22 and 24. These radios request working communications channels (WC) to make calls and receive working channel frequency assignments, for example, over the control channel.

One particular application of the present invention is to a digitally trunked radio repeater system such as that disclosed in U.S. Pat. No. 4,905,302 to Childress et al., the disclosure of which is incorporated herein by reference. Such a trunked radio repeater system may be used, for example, in a public service trunked (PST) system application. The Childress '302 patent provides a detailed description of one example way in which digitally trunked radio communications may be coordinated using a digital control channel.

It should be recognized that while the present invention is described in the context of a digitally trunked radio communications system for purposes of illustration and to facilitate description, the present invention equally applies to other radio communication systems including to cellular radio telephones. Moreover, although the present invention is well suited to and therefore described in the context of a digital radio communications system that employs a digital control channel, it is not limited to digital communications or to radio communication systems that use a control channel. To the contrary, the present invention may be used in more conventional analog radio environments where battery-operated radios monitor a radio channel that transmits any type of redundant idle messages.

Figure 2:
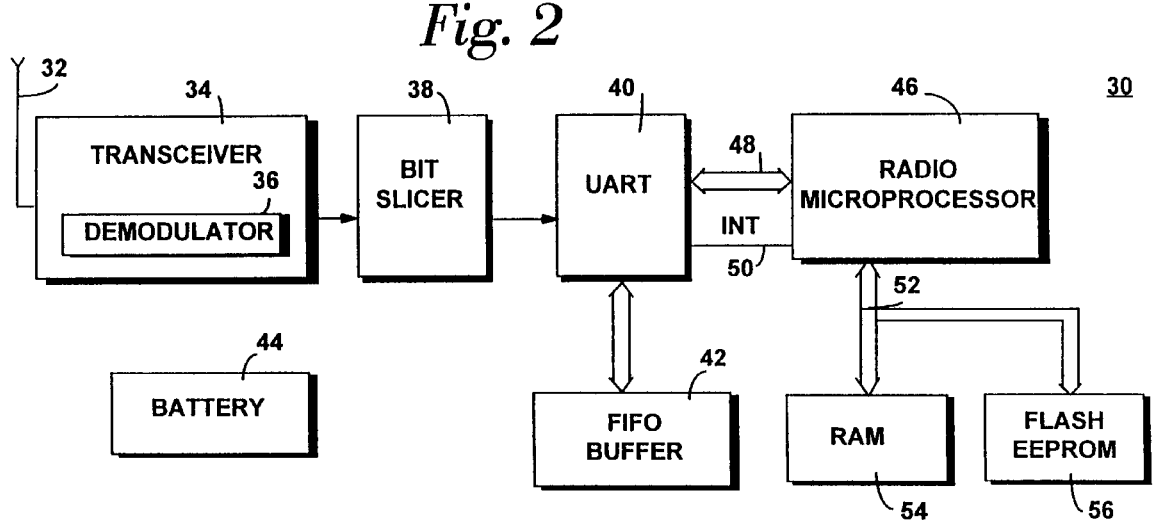
FIG. 2 is a function block diagram of a portable radio in accordance with one example embodiment of the present invention.

A function block diagram of a portable/mobile radio 30 in accordance with one example embodiment of the present invention is illustrated in FIG. 2. An antenna 32 is coupled to a conventional radio transceiver 34 which includes, among other things, a demodulator 36. When the transceiver 34 is tuned to receive on the control channel radio frequency (e.g., in response to a command from the radio microprocessor 46), transceiver 34/demodulator 36 convert the RF signal received via antenna 32 into a baseband signal which is then converted into a sequence of digital bits by conventional bit slicer 38. The bit stream of binary ones and zeros generated by bit slicer 38 is processed in a conventional universal asynchronous receiver-transmitter (UART) 40 which performs a number of functions, one of which includes grouping the serial stream of bits into eight bit bytes (i.e., serial-to-parallel conversion) and storing a message frame (e.g., 36 bytes) of received data in a first-in-first-out (FIFO) buffer 42. In this example, 36 bytes of information are stored in FIFO 42 because this number of bytes corresponds to the length of a single message frame transmitted over the digital control channel in a preferred embodiment. However, those skilled in the art will appreciate that any message length and therefore any number of bytes could be stored in the FIFO buffer.

When a message frame of 36 bytes of information is stored in the FIFO buffer 42, the UART 40 sends an interrupt signal (INT) over control line 50 to radio microprocessor 46. In response to that interrupt signal, radio microprocessor 46 retrieves the 36 bytes of FIFO data from UART 40 over parallel data bus 48. Radio microprocessor 46 performs various processing operations on the received message frame in accordance with program instructions retrieved from flash, electrically-erasable programmable read only memory (EEPROM) 56 using conventional address, data, and control bus 52. The radio microprocessor 46 uses random access memory (RAM) 54 as a working memory and to store information including a previously processed and decoded idle message.

The portable radio 30 includes a conventional battery 44 that supplies power to all of the circuitry in the radio including the transceiver 34, demodulator 36, the bit slicer 38, the UART 40, FIFO buffer 42, radio microprocessor 46, and RAM 54. The wire connections of the battery 44 to each element are not shown. The present invention conserves battery power in radio 30 by eliminating unnecessary processing of redundant messages such as idle messages on the control channel.

Prior art FIG. 3(a) illustrates an example of a message sequence transmitted on a digital control channel monitored by the portable/mobile radio 30. As described in the Background of the Invention, the message sequence includes a significant number of idle messages that are often repeatedly transmitted one after the other over the control channel. Occasionally, some type of message other than an idle message is transmitted such as a channel assignment message.

FIG. 3(b) shows an example format of a single message frame. Because radio communications channels are particularly susceptible to corruption from fading, adjacent channel interference, noise, weak signal strength, etc., plural copies of a single message are transmitted in a single message frame. The example format shown in FIG. 3(b) includes three copies of the message. More specifically, each message frame includes an initial synchronization field (SYNC) to permit the radio to synchronize to the control channel reference timing, followed by three copies of the message with each message copy including a message portion or field and a checkword portion or field. The checkword field includes error correction bits calculated for that particular message by a processor housed in the control channel transceiver in accordance with conventional error detection/correction encoding algorithms such as CRC algorithms.

FIG. 3(c) shows yet another example of a preferred message frame format. An initial synch field includes both synchronization bits (dotting) and word synchronization bits (Barker codes) along with three copies of the message. To further improve the accuracy of the data reception and facilitate the detection of errors, the second copy of the message is transmitted in complemented or inverted form. The portable radio then inverts the second copy of the message before voting and further processing.

FIG. 4 is a flowchart diagram illustrating example procedures for implementing the present invention. At first, the radio processes an initial message/message frame received on the control channel being monitored at a first power level (block 60). Such processing would include message demodulation, bit slicing and serial-to-parallel converting, voting and error correction to confirm the validity of the message, and message type detection as described above. For example, the three copies of the message, including the message content bits and its checkword bits, are compared bit for bit in a majority vote comparison. The value of each bit is determined in accordance with a two-out-of-three "majority rules" algorithm. The voted message is then checked for errors using the voted check word executing CRC decoding algorithms. Assuming that a valid message is decoded and determined to be an idle type of message, that message is stored in memory (e.g., RAM 54) in block 62.

Each subsequently received message is compared before further processing including voting and CRC checking with the message which was stored in memory (block 64). A decision is made in block 66 whether the subsequent message and the stored initial message match. If they do match, the subsequent message is confirmed as a redundant idle message which need not be further processed, and the radio is switched to a second power conserving level (block 68) until another message is received for comparison in block 64. If the compared messages do not match, the subsequent message is processed (block 70) including, for example, voting and error detection/correction as described above. If the processed message is valid, the message content is decoded to determine the type of message (e.g., channel assignment, status request, channel updates, etc.) followed by appropriate responsive action (block 72), (e.g., tuning to a working channel, etc.).

Figure 5:
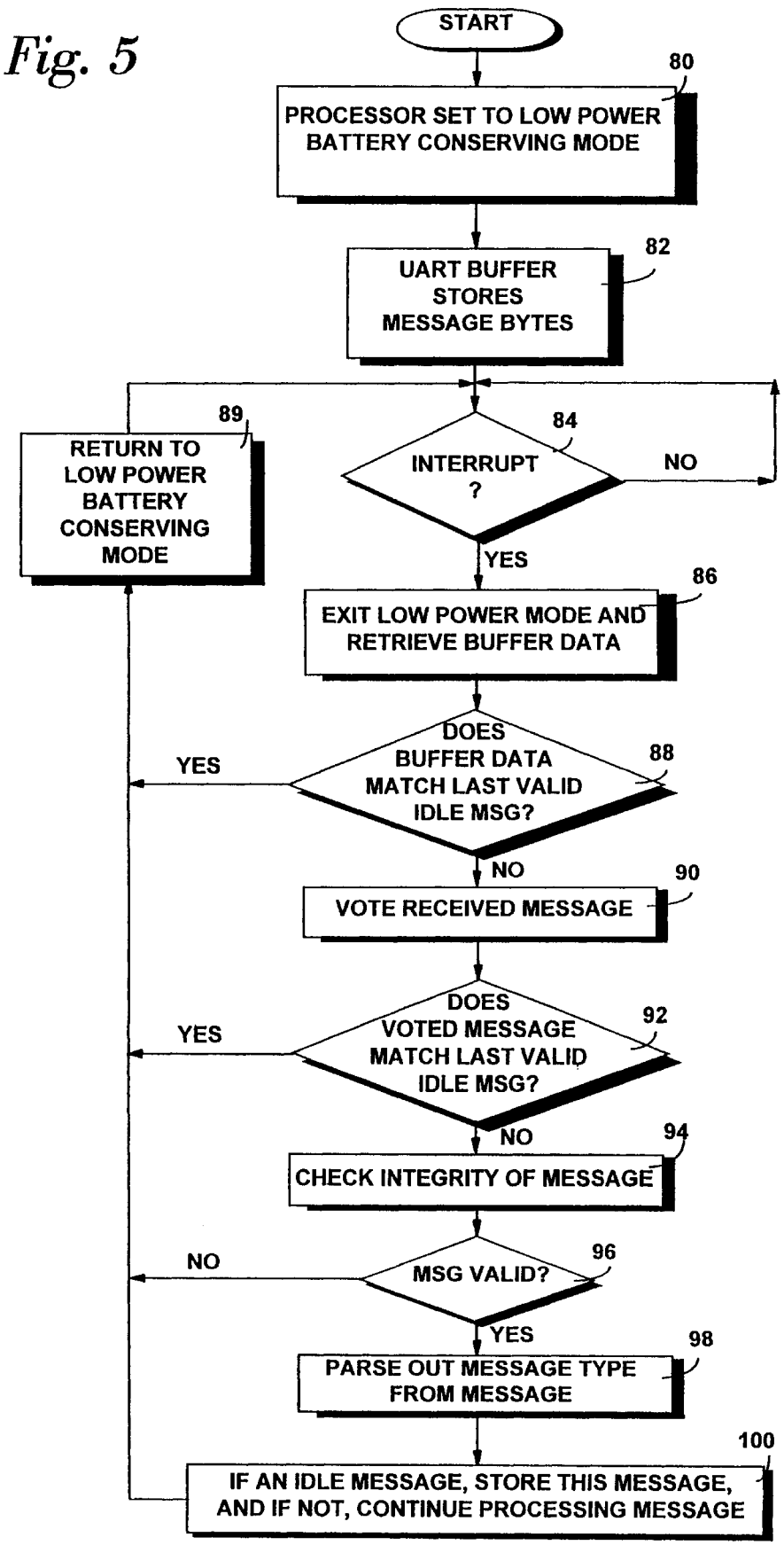
FIG. 5 is a flowchart diagram illustrating procedures performed by a portable radio to conserve battery power in accordance with another embodiment of the present invention.

One example embodiment of the present invention adapted to conserve power in the radio 30 illustrated in FIG. 2 is described now in conjunction with the flowchart illustrated in FIG. 5. In this embodiment, the radio microprocessor performs message processing operations under software control by executing programmed instructions stored in EEPROM. In block 80, the radio microprocessor 46 is set to a low power, battery conserving mode of operation where it is not performing message processing. Other battery conserving actions may also be taken as well during this mode. UART 40 stores message bytes in its FIFO buffer 42 (block 82). When a predetermined number of bytes corresponding to the length of a message frame is stored in the FIFO buffer 42, the UART 40 sends an interrupt (INT) to microprocessor 46. As indicated by the loop-back in block 84, the radio microprocessor 46 stays in the low power battery conserving mode until such an interrupt is received, at which time the microprocessor exits the low power, battery conserving mode and retrieves the FIFO buffer data (block 86).

A decision/comparison operation is made/performed in block 88 whether the buffer data matches the last valid idle message stored by the microprocessor 46 (block 88). If no prior idle message was previously processed and stored, or the data simply do not match, control proceeds to block 90. Otherwise, if there is a match, the radio microprocessor returns to the low power battery conserving mode (block 89) and waits for an interrupt from the UART 40 (block 84). In block 90, plural copies of the recently received message from the buffered message frame are voted, and a decision is made in block 92 whether the voted message matches the last valid idle message stored by the microprocessor 46. If there is a match, the microprocessor 46 returns in the low power battery conserving mode (block 89) waiting for interrupts from the UART 40 (block 84).

If there is no match, the radio microprocessor leaves the battery conserving mode and performs the processing necessary to determine the integrity/validity of the received message (block 94) using, for example, CRC type algorithms as noted above. If the message is determined in block 96 to be invalid, (e.g., erroneous and uncorrectable) the microprocessor returns to the low power battery conserving mode (block 89) and continues to look for an interrupt from the UART 40. If a valid message is received, the microprocessor decodes the message to determine the message type, e.g., an idle message, a channel assignment message, etc. (block 98). If the message is an idle message, it is stored, and if it is not an idle message, the substantive content of the message is further processed by the radio microprocessor (block 100). Thereafter, the radio microprocessor returns to the battery conserving mode waiting for an interrupt indicating receipt of another complete message frame.

Figure 6:
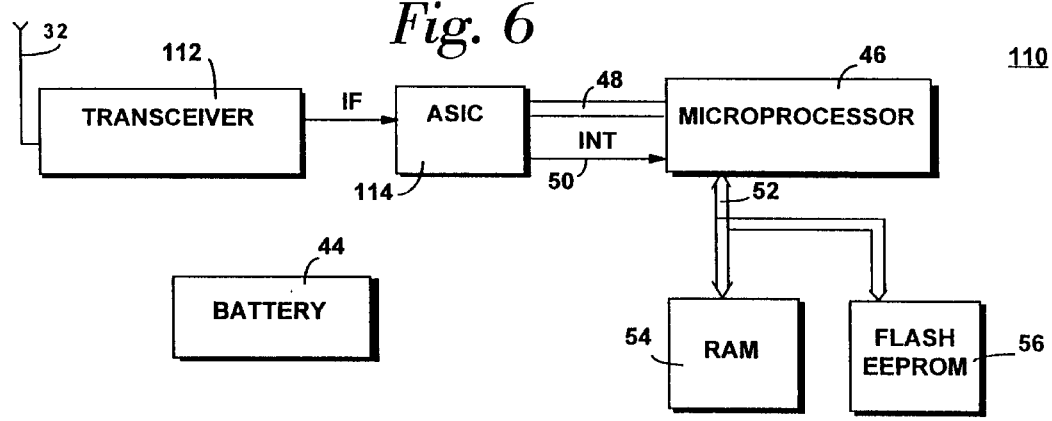
FIG. 6 is a function block diagram of a portable radio in accordance with another embodiment of the present invention.

FIG. 6 shows another specific example embodiment of the present invention. The radio 110 in accordance with FIG. 6, includes the antenna 32, data bus 48, interrupt line 50, microprocessor 46, battery 44, RAM 54, flash EEPROM 56, and address, data, control bus 52 as described for FIG. 2. However, an application specific integrated circuit (ASIC) 114 is used to perform many of the progressing functions performed by discrete elements and the microprocessor shown in FIG. 2. Specifically, transceiver 112 frequency converts the radio frequency signal to an intermediate frequency signal which is then input to the ASIC 114. The hardware circuits integrated on ASIC 114 are specially designed and optimized to efficiently perform demodulation of received signals to baseband frequency, bit slicing and word framing to generate a series of 8-bit bytes which are stored in a buffer on the ASIC, voting and error detection/correction. The design and manufacture of ASIC chips are well known to those skilled in the art. The specific hardware design of course depends on a number of factors unrelated to this application, and need only implement bit-for-bit majority vote and CRC error detection/correction operations using conventional integrated hardware logic circuits.

The ASIC hardware is designed and dedicated to perform these operations and does so both faster than the radio microprocessor can perform them and at considerably reduced current drain as compared to having those operations performed by the radio microprocessor. In other words, the signals are processed without requiring the addressing of program instructions in EEPROM memory, retrieval of those instructions, buffering of those instructions, execution of these instructions, and the actual manipulation of the data by the microprocessor's CPU and related registers to perform those operations. While the ASIC 114 adds some additional circuitry and cost and lacks the flexibility of a programmable device, the ASIC provides a considerable advantage in terms of battery conservation.

The ASIC 114 could be designed to implement in hardware logic circuitry the processing outlined in the flowchart in FIG. 4. Alternatively, because of its efficient, low power operation, the ASIC 114 could fully process each received message and only interrupt the radio microprocessor when the fully processed message is other than a repeated idle message.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for operating a portable radio that monitors a radio channel and receives message frames transmitted on the radio channel, each message frame including an identifier and control part and a messaging part, comprising the steps of:

(a) in a first power mode where the portable radio operates at a first power level, processing an initial message frame received on the channel;

(b) storing the processed message frame;

(c) for a subsequent message frame received on the channel, comparing the message part of the subsequent message frame with at least a portion of the stored message frame;

(d) if the comparing step does not result in a match, continuing processing of the received message frame in the first power mode; and (e) if the comparing step results in a match, entering a second power mode where the portable radio operates at a second power level lower than the first power level such that the portable radio consumes less power in the second power mode than in the first power mode and where the continued processing of the received message frame in the first power mode is not performed, wherein the portable radio continues to receive a next message frame from the radio channel at the second power level, and after receiving the next message frame, the portable radio repeats steps (c), (d), and (e).

2. The method in claim 1, wherein the initially received message frame is in digital form and includes plural copies of the message part, each message part including a message field and an error checking field, and the processing step includes voting the plural copies of the message part to generate a voted message part.

3. The method in claim 2, wherein the processing step includes performing an error checking operation on the voted message part using information in the error checking field to determine whether the message part is accurately received and the storing step includes storing the error checked message part for use in the comparing step.

4. The method in claim 3, wherein the radio channel is a digital control channel monitored by the radio for control message frames and the stored, error checked message part is an idle message repeated on the control channel in the absence of a different type of message on the control channel.

5. The method in claim 2, wherein if the comparing step does not result in a match, further comprising the steps of:

(a) voting the plural copies of at least the message part of the subsequent message frame;

(b) comparing the voted message to at least a portion of the stored message frame; and (c) if the comparing step (b) results in a match, discarding the voted message and switching the radio into the second power level mode.

6. The method in claim 1, wherein if the comparing step results in a match, the subsequent message frame is not further processed, and if the comparing step does not result in a match, the subsequent message frame is processed in the first power mode.

7. The method in claim 1, wherein the comparing step includes comparing the stored message frame with the entire subsequently received message frame.

8. A battery-powered portable radio that monitors a radio channel and receives message frames, each message frame including an identifier and control portion and a message portion, comprising:

transceiving circuitry transmitting and receiving radio message frames over the radio channel, each message frame including plural copies of the message, each message copy including a message field and an error checking field;

a buffer storing each received message frame from the transceiving circuitry;

a processor, including a memory for storing program instructions, selectively processing, at a first power level, received message frames stored in the buffer in accordance with the program instructions and storing a processed message frame;

wherein the selective processing includes the processor comparing the message portion of a received message frame with at least a portion of the previously stored message frame, determining that the message portion of the received message frame does not match the portion of the previously processed message and continuing processing of the message portion of the received message frame at the first power level, and otherwise determining that at least the message portion of the received message frame matches a portion of the previously stored message frame, and operating, in response to that other determination, the radio in a battery conserving mode at a second power level less than the first power level including discontinuing further processing of the received message frame by the processor, and wherein the portable radio continues to receive a next message frame from the radio channel at the second power level, and after receiving the next message, the processor repeats the selective processing at the first power level.

9. The portable radio in claim 8, further comprising:

an asynchronous transceiver that sends an interrupt signal to the processor when a received message frame is stored in the buffer which brings the processor out of the battery conserving mode to determine whether at least a portion of a processor stored message is the same as a next message portion received by the portable radio while in the battery conserving mode and stored in the buffer and whether to return the radio to the battery conserving mode.

10. The portable radio in claim 8, wherein when the received message portion is different from the processor stored message, the processor performs a voting operation on the received message frame using the plural copies of the message to generate a voted message.

11. The portable radio in claim 10, wherein if the processor determines the voted message frame is the same as the processor stored message frame, the processor operates the radio in the battery conserving mode until a next received message frame is stored in the buffer.

12. The portable radio in claim 10, wherein if the processor determines the voted message frame is different from the processor stored message frame, the processor performs an error checking operation on the voted message frame using information in error checking field of the voted message frame, and if the error checked message frame is valid, the processor further processes the message frame to determine if the received message frame is a type to be stored.

13. The portable radio in claim 8, wherein the radio is a digitally trunked radio which monitors digital control information transmitted by a base station on a digital control channel, wherein the radio requests a working radio channel over the control channel each time the radio initiates a call.

14. The portable radio in claim 13, wherein the base station transmits a substantially continuous stream of redundant message frames identifying the base station between other types of periodically transmitted messages frames, and wherein processing the redundant message frames consumes battery power.

15. The portable radio in claim 8, wherein the comparing step includes comparing the stored message frame with the entire subsequently received message frame.

16. A battery-operated portable radio that monitors a digital control channel for digital control messages, comprising:

transceiving circuitry transmitting and receiving the digital control messages, each message including plural message copies, each message copy including a message field and an error checking field;

integrated logic circuitry determining whether a currently received message matches a previously stored message, and if not, performing a voting operation on the currently received message using the plural copies of the currently received message to generate a voted message, determining if the voted message matches the previously stored message, and if not, checking the validity of the voted message; and a programmable processor, including a memory for storing program instructions, processing the valid voted message transmitted from the integrated logic circuitry, wherein the integrated logic circuitry uses less power than the programmable processor would use performing the voting and validity checking operations.

17. The radio in claim 16, wherein the integrated logic circuitry is an application specific integrated circuit.

\* \* \* \* \*